United States Patent [19]

Bensadon et al.

[11] Patent Number: 4,551,835
[45] Date of Patent: Nov. 5, 1985

[54] X.21 SWITCHING SYSTEM

[75] Inventors: Joseph M. Bensadon, Germantown; Norman F. Brickman, Potomac, both of Md.

[73] Assignee: International Business Machines Corporation, Armonk, N.Y.

[21] Appl. No.: 508,312

[22] Filed: Jun. 27, 1983

[51] Int. Cl.⁴ ............................................... H04J 3/12
[52] U.S. Cl. ................................... 370/110.1; 370/104
[58] Field of Search ...................... 370/110.1, 104, 111

[56] References Cited

U.S. PATENT DOCUMENTS

| | | | |
|---|---|---|---|
| 3,211,839 | 10/1965 | Adelaar et al. | 179/84 |
| 3,470,542 | 9/1969 | Trantanella | 340/173 |
| 3,516,071 | 6/1970 | Roos | 340/172.5 |
| 3,772,475 | 11/1973 | Loffreda | 179/15 BS |
| 3,815,095 | 6/1974 | Wester | 340/172.5 |
| 3,909,540 | 9/1975 | Maryscuk et al. | 179/15 BS |
| 3,922,493 | 11/1975 | Brenig et al. | 179/15 AL |
| 3,936,609 | 2/1976 | Waldeck | 179/15 BS |
| 3,938,098 | 2/1976 | Garlic | 340/172.5 |
| 3,995,119 | 11/1976 | Pachynski, Jr. | 179/15 BS |
| 3,995,120 | 11/1976 | Pachynski, Jr. | 179/15 BS |
| 3,997,728 | 12/1976 | Duquesne et al. | 179/15 BS |
| 4,047,157 | 9/1977 | Jenkins | 364/900 |
| 4,068,104 | 1/1978 | Werth et al. | 179/175.3 R |
| 4,075,691 | 2/1978 | Davis et al. | 364/200 |
| 4,128,883 | 12/1978 | Duke et al. | 364/200 |
| 4,178,483 | 12/1979 | Lager et al. | 179/18 BY |
| 4,211,895 | 8/1980 | Davis et al. | 370/110 |
| 4,252,999 | 2/1981 | Acampora et al. | 370/104 |
| 4,268,722 | 5/1981 | Little et al. | 370/62 |
| 4,271,509 | 6/1981 | Brolin | 370/110 |
| 4,281,410 | 8/1981 | Agricola et al. | 370/62 |
| 4,307,461 | 12/1981 | Brickman et al. | 370/58 |
| 4,330,857 | 5/1982 | Alvarez et al. | 370/104 |
| 4,332,026 | 5/1982 | Alvarez, III et al. | 370/66 |
| 4,434,486 | 2/1984 | Barner et al. | 370/110.1 |

OTHER PUBLICATIONS

V. Yanoschak, Data Communications, vol. 10, No. 2, pp. 83-97, "Implementing the X.21 Interface".
IBM TDB, "In Band Signalling System", by M. Boisseau, et al., vol. 19, No. 4, Sep. 1976, pp. 1276-1278.

Primary Examiner—Douglas W. Olms
Assistant Examiner—Frank M. Scutch, III
Attorney, Agent, or Firm—John E. Hoel

[57] ABSTRACT

A system is disclosed to provide X.21 in-band call establishment signaling in the data path of a data communication system by utilizing a data port, digital switch and telephone signaling call processor in a satellite communications controller. The system includes an X.21 signaling protocol between a DTE and the satellite communications controller on the terrestrial side and allows self-switched digital data port functions in lieu of associated voice port and line functions as practiced in the prior art. An important aspect is that the signaling rate is the same as the line data rate. The data port goes through three generalized states during a normal call process. The first general state is idle, the second general state is the signaling state and the third general state is the data transfer state. At the start of the signaling state, the E input to the call processor is activated for the appropriate port. Call establishment signals are then processed through the digital switch and an X.21 adapter to the system's control processor. In the third data transfer state, the call establishment signaling has been completed and all data bits go through the digital switch and are transmitted to the digital interface. At the end of the call the data port goes back to the first, idle state.

The significant overall feature of the system is the provision for X.21 in-band signaling on the terrestrial side of the satellite communications controller so that a digital data port can accept X.21 in-band call processing type signals. The digital data port detects the call processing type signals with the X.21 protocol and passes them on to the X.21 adapter in the satellite communications controller.

8 Claims, 20 Drawing Figures

FIG. 1a
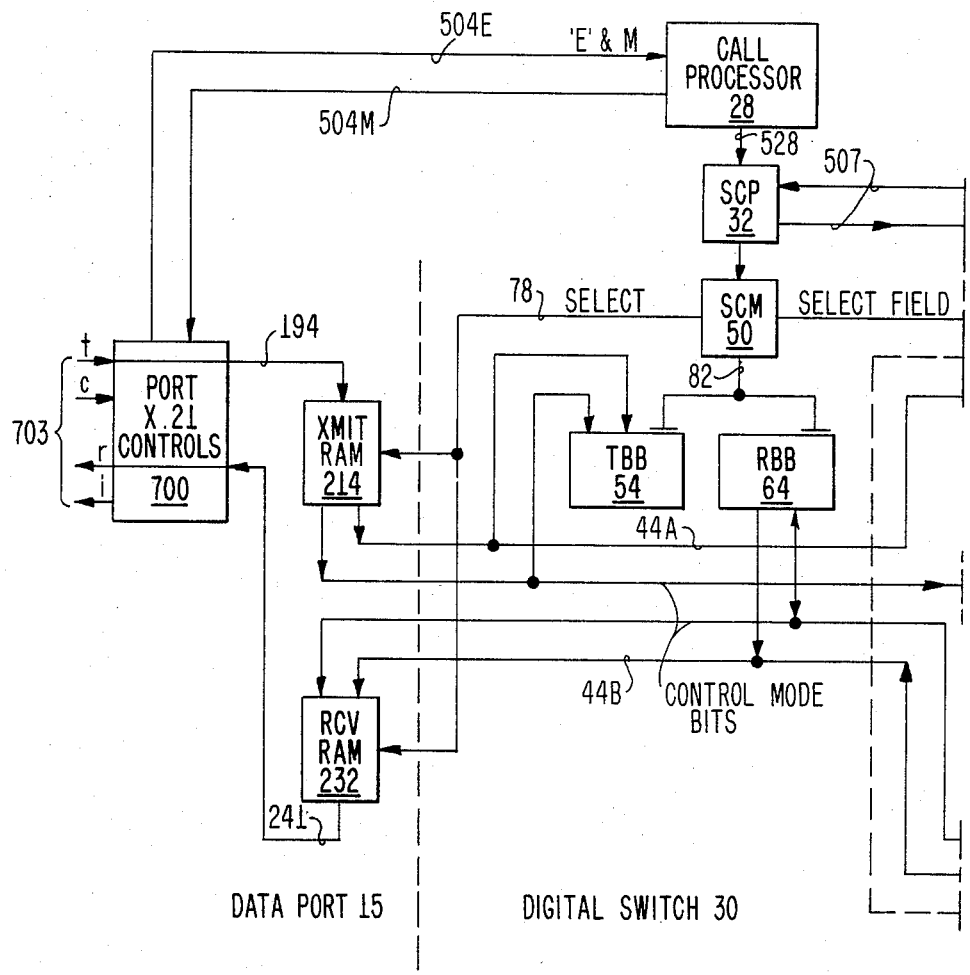
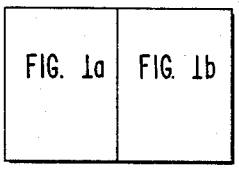
FIG. 1

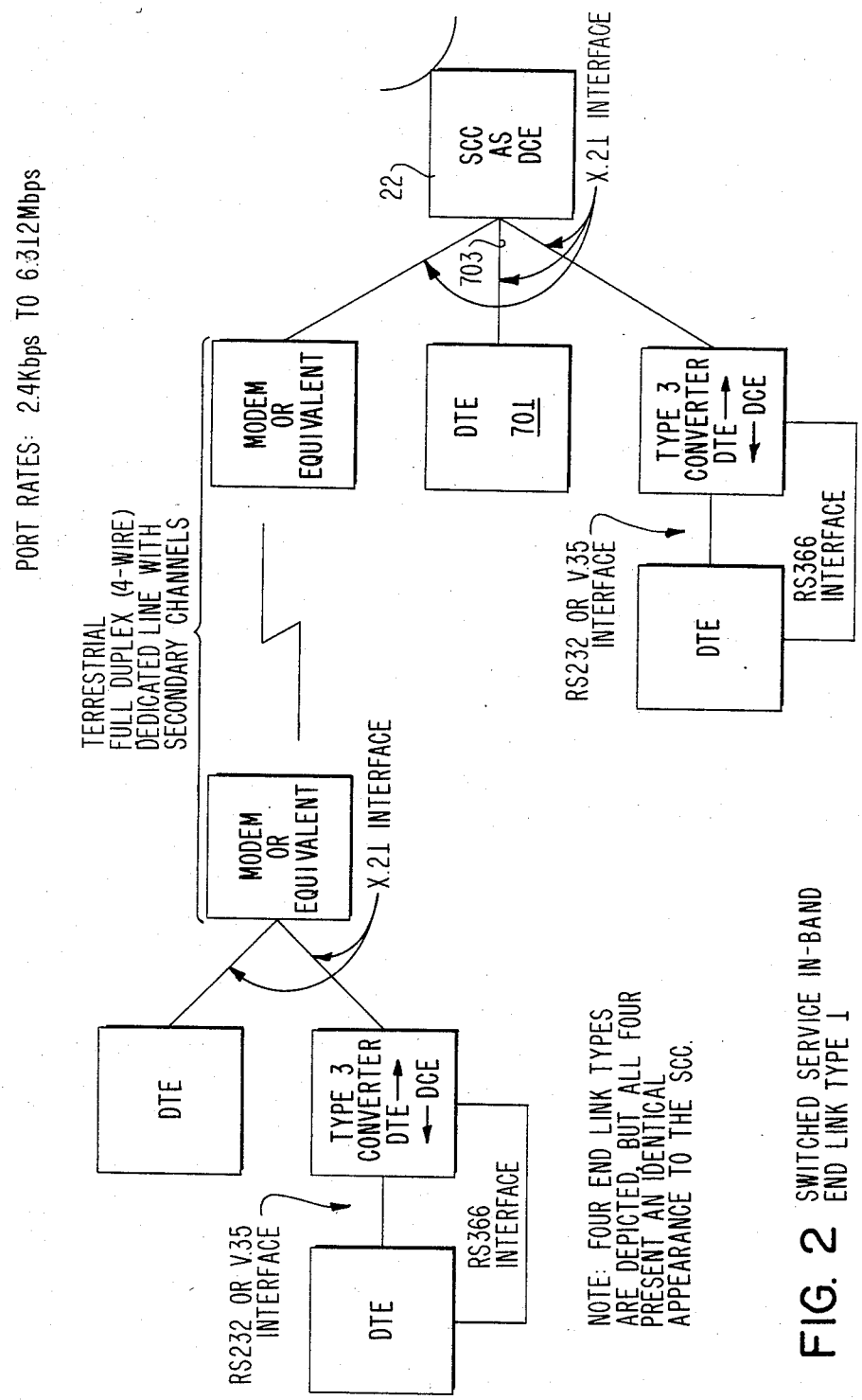
FIG. 2 SWITCHED SERVICE IN-BAND END LINK TYPE 1

FIG. 4  DIGIT BUFFER AREA X.21 ADAPTER 708

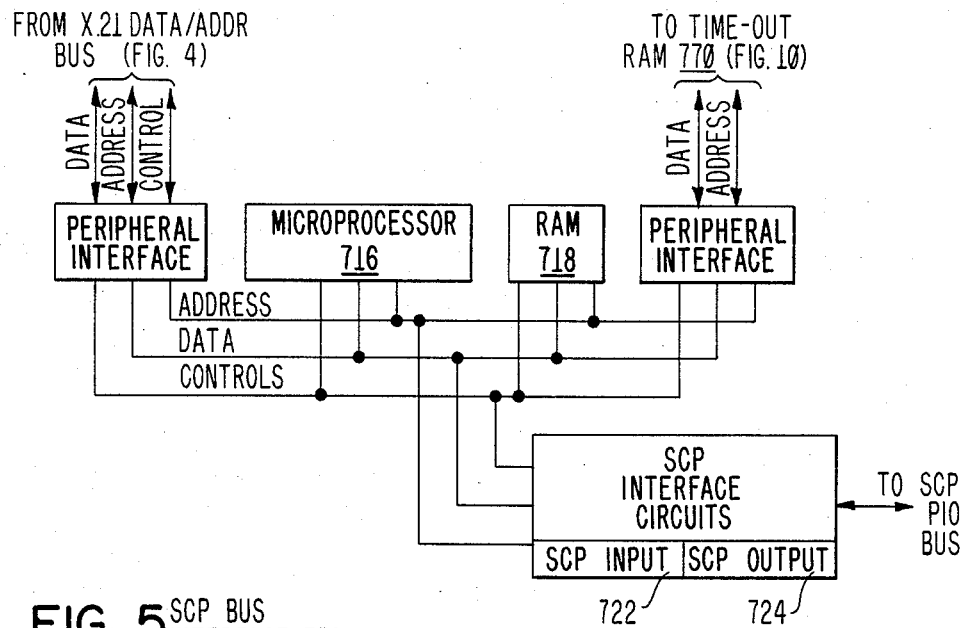
FIG. 5 SCP BUS INTERFACE 750
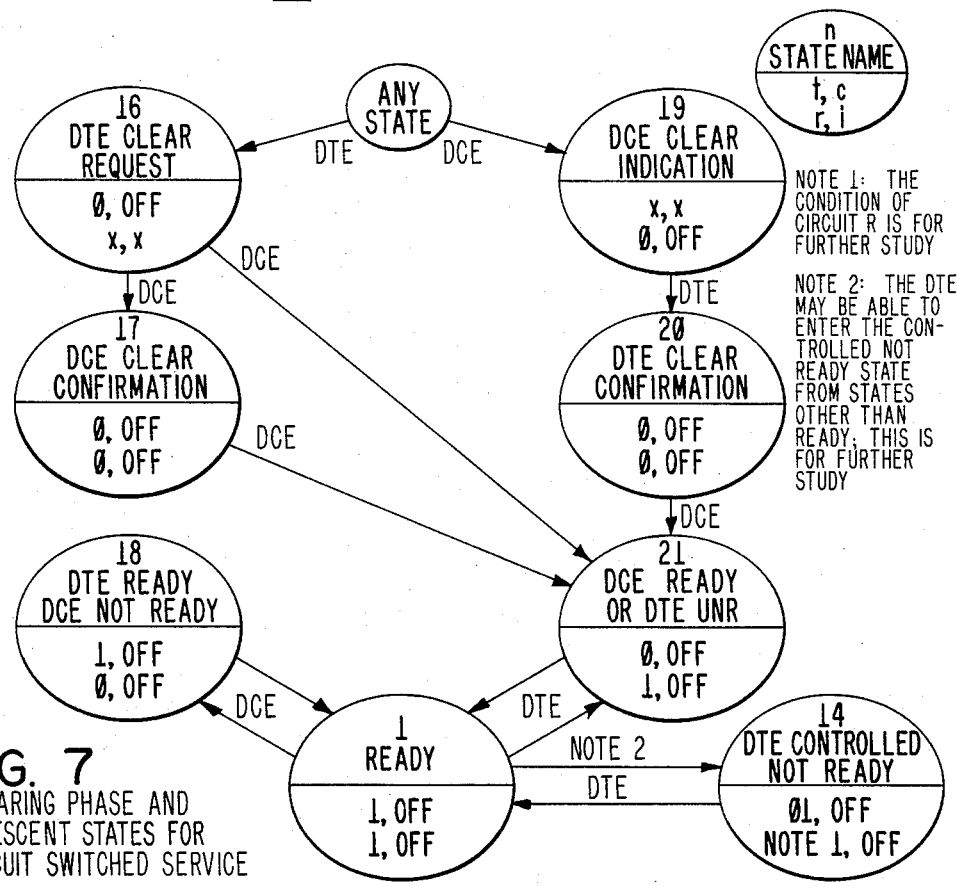
FIG. 7
CLEARING PHASE AND
QUIESCENT STATES FOR
CIRCUIT SWITCHED SERVICE DATA PORT
2.4Kbps-224Kbps

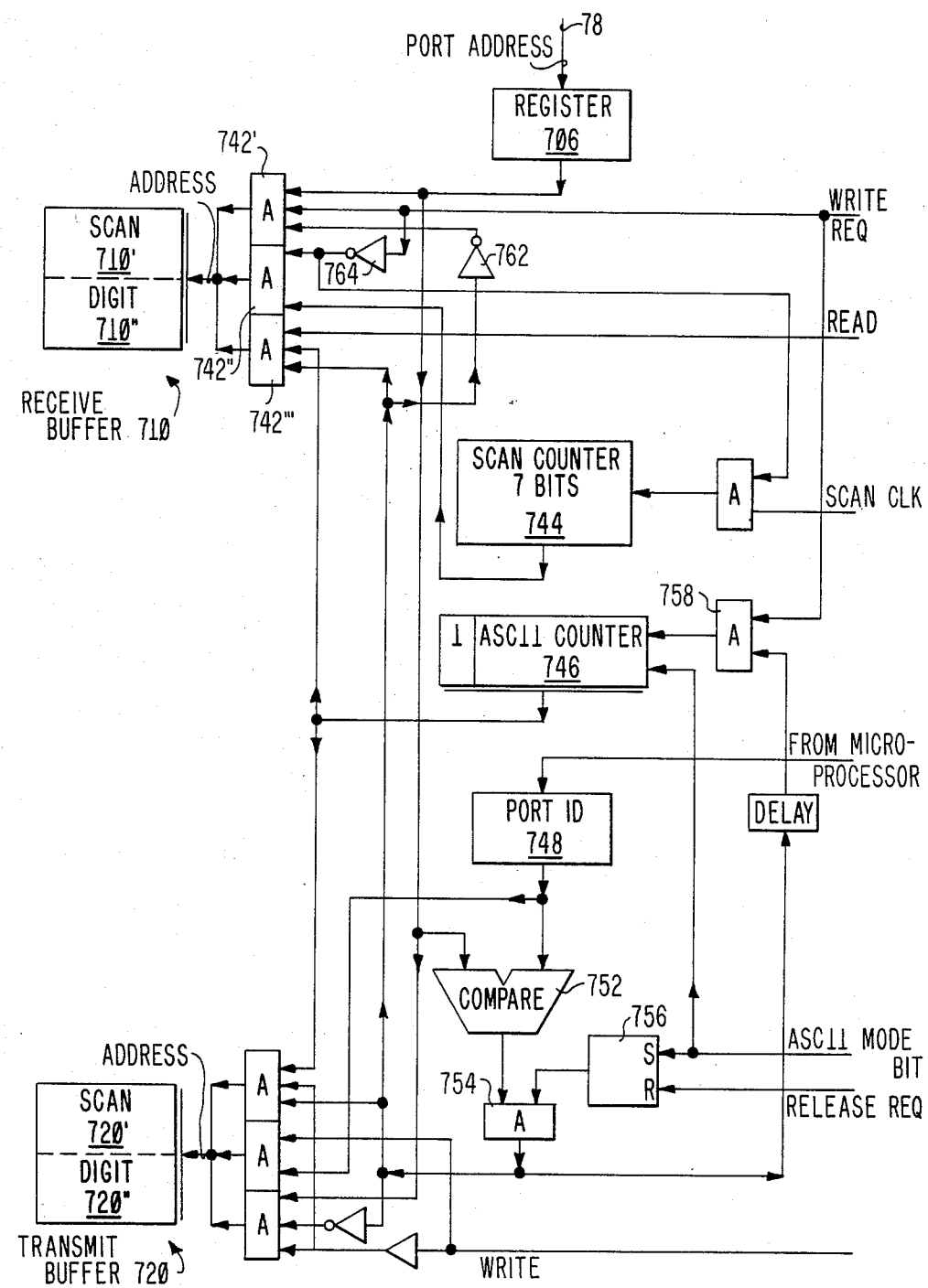
FIG. 12 CONTROL MODULE 760

X.21 SWITCHING SYSTEM

DESCRIPTION

1. Field of the Invention

The invention disclosed herein broadly relates to communication equipment and more particularly relates to in-band signaling communications equipment.

2. Background of the Invention

The ANSI X.21 standard was developed to provide a general purpose interface between a user's data terminal equipment (DTE) and data circuit terminating equipment for synchronous operation on public data networks. This standard, which has been published for example in (1) American National Standard Institute Publication titled "ANSI X.21"- Fourth Draft, Oct. 5, 1976 and (2) CCITT Recommendation X.21 Fascicle VIII.2, Vol. VIII, Geneva, 1972; amended at Geneva 1976 and 1980 defines the interface characteristics, interface procedures and timing of events, signal formats, and failure detection and isolation for a general purpose interface to enable the transfer of binary data, call control signals, and timing signals.

A four wire serial interface is provided comprising lines t, r, c and i. Line t is the transmit line and carries binary signals originated by the DTE to be transmitted during the data transfer phase to the data communications equipment (DCE). This line t also transfers the call control signals originated by the DTE in the call establishment. The DCE monitors this line for detection of electrical circuit fault conditions.

The r line carries binary signals sent by the DCE as received during the data transfer phase to the DTE. The r line also transfers call control signals sent by the DCE during the call establishment phase. The DTE monitors this line for the detection of electrical circuit fault conditions.

The c line is used in conjunction with appropriate signals on the t line to control the DCE. The DCE monitors this circuit for detection of electrical circuit fault conditions.

The i line carries signals which are used in conjunction with appropriate signals on the r line to indicate to the DTE the state of the call control process. The DTE monitors the i line for detection of electrical circuit fault conditions.

A fifth line can be provided which is designated the s line, to convey signals which provide the DTE with timing information.

The combinations of states of the four lines t, r, c and i which convey the necessary call control information during the call establishment phase, are described by means of the state diagrams in the ANSI X.21 standard publication referenced above and shown in FIGS. 6 and 7 herein.

An X.21 data port goes through three generalized states during a normal call process. The first state is idle, the second state is the signaling state for establishing the call, and the third state is the data transfer state. During the signaling state, call establishment signals are of two principal types. The first type is a single character or byte which is transferred from the DTE to the DCE or from the DCE to the DTE to indicate a call request, to respond with a proceed-to-select, or other simple handshaking steps. The second type of call establishment signals are multiple character or multiple byte signals which are, for example, the selection signals providing the trunk line or telephone number for the called location or, as another example, call progress signals which are a response by the DCE to the DTE.

A specific example of a DCE is the satellite communications controller described in U.S. Pat. No. 4,332,026 to Alvarez, et al. entitled "Multiple Data Rate Digital Switch for a TDMA Communications Controller," and in U.S. Pat. No. 4,307,461 to Brickman, et al. entitled "Call Processor for a Satellite Communications Controller," both patents being assigned to the instant assignee. These patents describe a satellite communications controller which provides a data link between DTEs which are geographically remote from one another, by means of a time domain multiple access (TDMA) satellite communications network.

What is needed is an X.21 in-band signaling apparatus to be used in conjunction with such a TDMA satellite communications controller to enable X.21 signaling protocol to be employed between a DTE and the satellite communications network, to permit self-switched digital data port functions to take place at a signaling rate which is the same as the line data rate for the DTE.

OBJECTS OF THE INVENTION

It is therefore an object of the invention to provide an X.21 in-band signaling capability in a data communications system by utilizing a data port, a digital switch and a telephone signaling call processor in a satellite communications controller.

It is yet a further object of the invention to provide an X.21 in-band signaling capability for a satellite communications controller which has a signaling rate which is the same as the line data rate.

SUMMARY OF THE INVENTION

These and other objects, features and advantages of the invention are accomplished by the X.21 switching system disclosed herein. The problem of transferring the two types of call establishment signals between the DTE and the DCE at the data rate characteristic of the DTE, is solved by providing a pair of compound buffers which are operated under the control of a microprocessor programmed with the X.21 control state protocol. This enables the transfer of both types of call establishment signals between the plurality of X.21 data ports operating at various data rates and the control processor in the DCE which will set up the call once the transfer of the call establishment signals is completed.

DESCRIPTION OF THE FIGURES

FIGS. 1a and 1b are the interconnection of the X.21 adapter with the balance of the satellite communications controller.

FIG. 2 is a functional block diagram of switched service in-band end link operation.

FIGS. 4, 4a and 4b are the interconnection of the receive buffer and transmit buffer in the X.21 adapter.

FIG. 5 is a functional block diagram of the SCP bus interface in the X.21 adapter.

FIG. 7 is a state diagram of the clearing phase and quiescent states for circuit switched service using the X.21 standard.

FIG. 12 is a more detailed diagram of the control module.

DISCUSSION OF THE PREFERRED EMBODIMENT

The System Environment

Figure 1B:
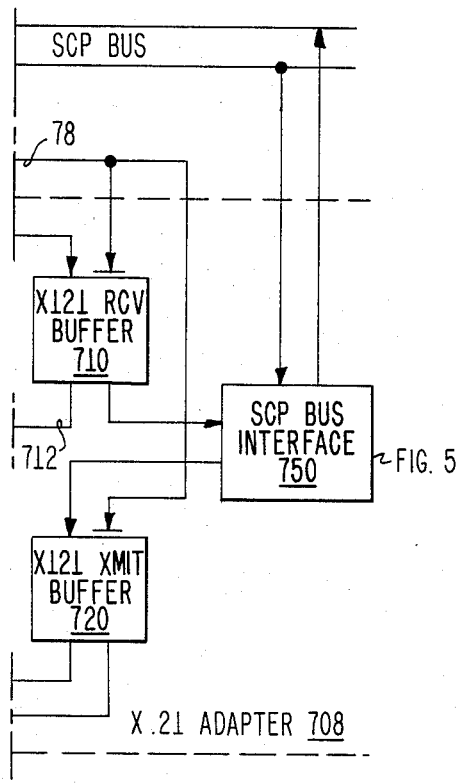

The X.21 switching system disclosed herein finds specific application in the satellite communications controller 22 which is described in U.S. Pat. No. 4,332,026 to Alvarez, et al. issued May 25, 1982 and assigned to the instant assignee and also as described in U.S. Pat. No. 4,307,461 to Brickman, et al. entitled "Call Processor for a Satellite Communications Controller," issued Dec. 22, 1981, and assigned to the instant assignee. Both the Alvarez, et al. and the Brickman, et al. patents are incorporated herein by reference for the disclosure of the elements of the satellite communications controller 22 therein. Reference numbers herein which are less than 700 refer to elements which are also disclosed in the Alvarez, et al. and Brickman, et al. patents.

The TDMA communications controller 22 which is disclosed in the Alvarez, et al. and the Brickman, et al. patents includes a plurality of input/output ports 15 for transferring $n_i$ channels of m data units each per TDMA frame from respective, local data users to a TDMA transmit burst communication link 7 and transferring $n_i$ of the channels of data from a TDMA receive burst communication link 6 to the respective local users on a time interleaved basis during periodic TDMA frames, each port 15 operating at its own data rate $R_i$. The data terminal equipment 701 is operatively connected to one port 15 of the plurality of ports as shown in FIG. 2.

The controller 22 further includes a transmit burst buffer 54 shown in FIG. 1 having a data input connected to a transmit bus 44A common to the data outputs of the ports 15 and a data output connected to the TDMA transmit burst communication links 7, with a plurality of addressable storage locations arranged into rows and m juxtaposed columns.

The controller 22 also includes a receive burst buffer 64 shown in FIG. 1 having a data input connected to the TDMA receive burst communication link 6 and a data output connected to a receive bus 44B common to the data inputs of the ports 15, with a plurality of addressable storage locations arranged into rows and m juxtaposed columns.

The controller 22 further includes a scanner 70 having a periodic cycle of m scans per TDMA frame, there being a frame rate of f frames per second, with a scan count output 77 connected as a column address input to the transmit burst buffer 54 and to the receive burst buffer 64.

The controller 22 also includes a switch control memory 50, having an address input connected to a scan output 75 of the scanner 70, a port select output 78 connected to a control input to each of the ports 15 and a stored address output 82 connected to a row address input to the transmit burst buffer 54 and to the receive burst buffer 64, for storing $n_i$ control words for each of the ports 15, each of $n_i$ control words for the i-th port and issuing a port select signal on line 78 to the i-th port and issuing a distinct row address on line 82 to the transmit burst buffer 54 and the receive burst buffer 64 when scanned by the scanner 70, where $n_i = R_i/mf$.

The controller 22 further includes a call processor 28 having an E-lead input 504E connected to an E-lead output of the ports 15, for receiving off-hook signals from the ports.

The controller 22 also includes a control processor 32 having an input 528 connected to the call processor, for processing call establishment signaling information from the one port 15 in response to the call processor 28 signaling that an off-hook signal from the data terminal equipment 701 has been received on the E-lead 504E from the one port 15.

Overview of the X.21 Switching System

The problem of transferring the two types of call establishment signals between the DTE and the DCE at the data rate characteristic of the DTE, is solved by providing a pair of compound buffers which are operated under the control of a microprocessor programmed with the X.21 control state protocol. This enables the transfer of both types of call establishment signals between the plurality of X.21 data ports operating at various data rates and the control processor in the DCE which will set up the call once the transfer of the call establishment signals is completed.

Figure 8A:
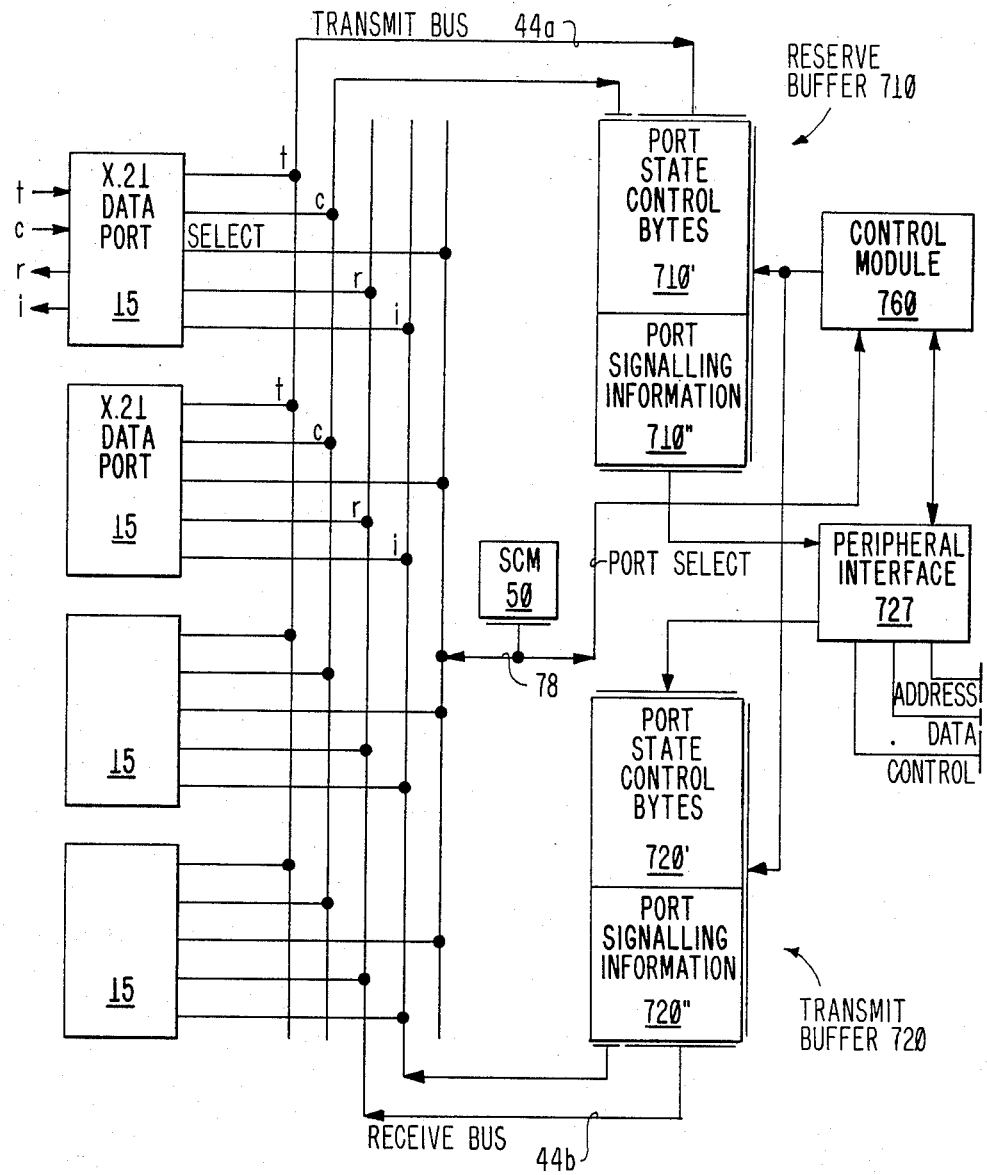
FIGS. 8, 8a and 8b show the interconnection of some of the elements of the invention.
Figure 8:
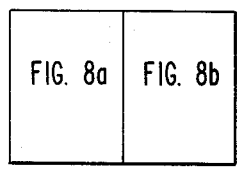
Figure 8B:
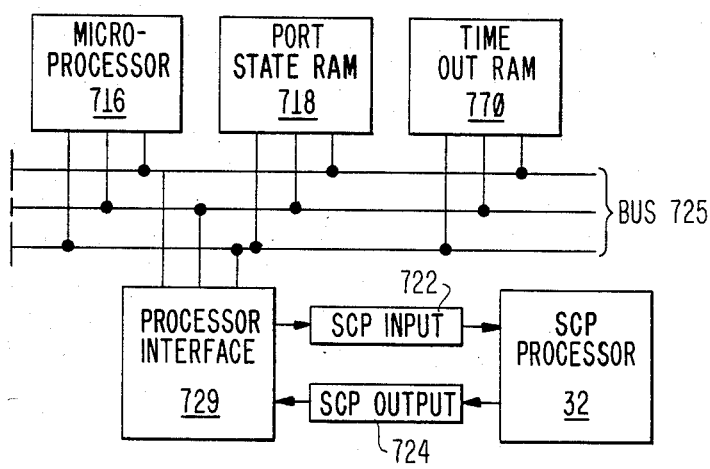

As is seen in FIG. 8, the communications controller 22 has a plurality of X.21 data ports 15 each connected to a t and a c input line from a respective DTE and each data port connected to an r and an i output line to the respective DTE. The data ports 15 receive periodic select signals over line 78 from the switch control memory 50 in the digital switch of controller 22, to transfer byte message units to and from the data ports over the transmit bus 44A and the receive bus 44B, respectively, at the various data rates of the respective data ports 15.

The compound buffers which enable the transfer of the two types of X.21 call establishment signals, are the receive buffer 710 which is connected to the transmit bus 44A, and the transmit buffer 720 which is connected to the receive bus 44B. Their read and write operations are controlled by the microprocessor 716 via the processor bus 725.

Figure 9:
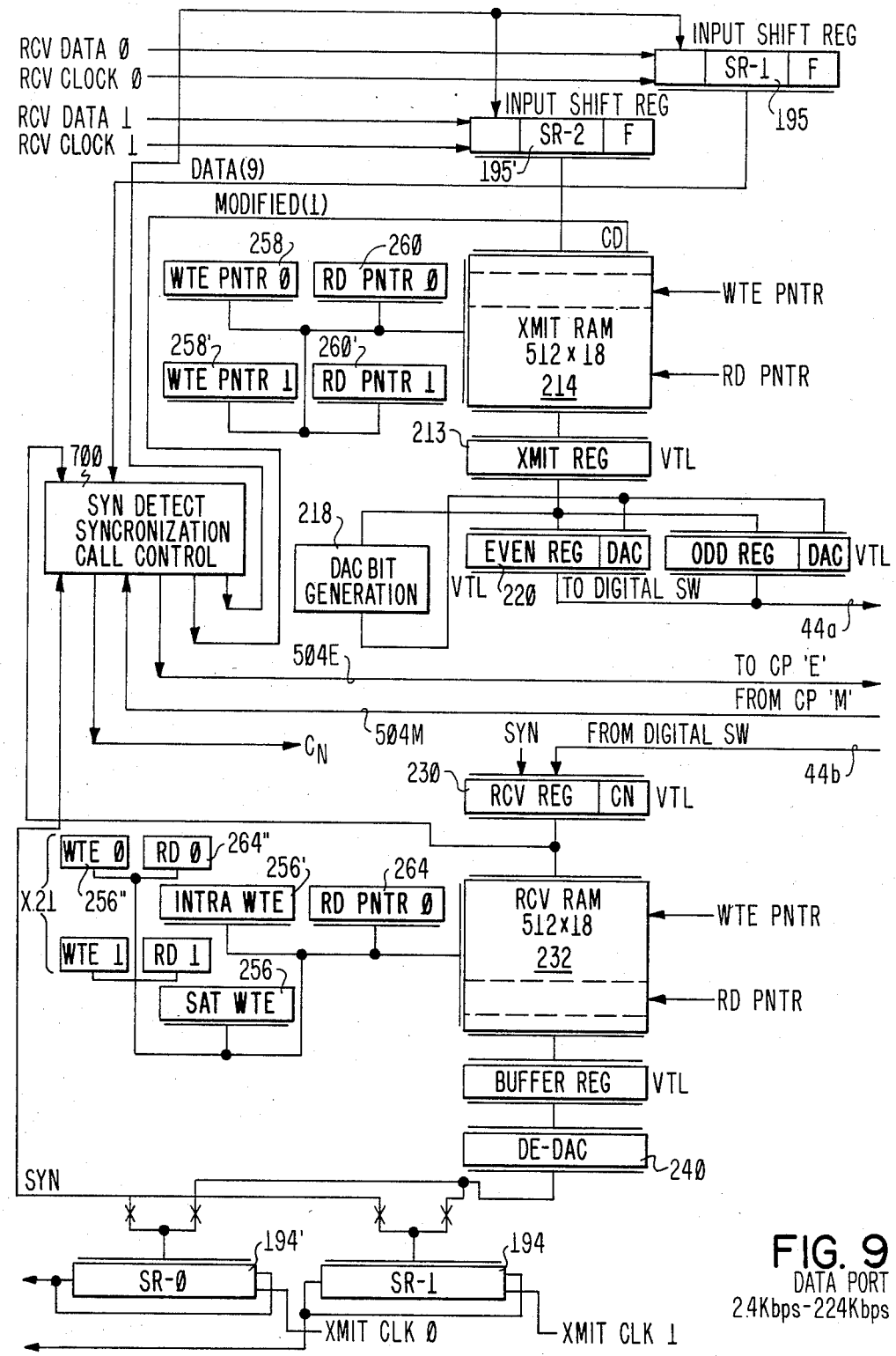
FIG. 9 is a detailed functional block diagram of the data port.

The first compound buffer is the receive buffer 710 which has a data input connected to the transmit bus 44A. The transmit bus 44A is connected in common to the plurality of data ports 15. As is seen in FIG. 9, the t line and the c line is connected from the DTE through the data port to the transmit bus 44A. The receive buffer 710 has an address input connected to the output of the control module 760 which is controlled by the microprocessor 716. The data output of the receive buffer 710 is connected to the processor bus 725 through the peripheral interface 727.

The receive buffer 710 is divided into a scan portion 710' for buffering individual bytes of port state control message units from each of the X.21 data ports 15. The receive buffer 710 has a second portion which is the digit portion 710" for buffering a plurality of up to 128 bytes of port signaling information message units from a selected one of the X.21 data ports 15. The data rate for writing the bytes of call establishment message units into the receive buffer 710 from the transmit bus 44A is the data rate of the respective data port 15.

The second compound buffer is the transmit buffer 720 which has a data input connected through the peripheral interface 727 to the processor bus 725, and an address input connected to the output of the control module 760 which is under the control of the microprocessor 716. The transmit buffer 720 has a data output connected to the receive bus 44B. The receive bus 44B is connected in common to the r line and the i line for each of the X.21 data ports 15. As is seen in FIG. 9, the r line and the i line from the receive bus 44B is connected through each respective X.21 data port 15 to the r line and the i line connected from the data port 15 to its respective DTE.

The transmit buffer 720 is divided into a scan portion 720' which buffers individual bytes of port state control message units which are transferred from the processor bus 725 to the data port 15. The transmit buffer 720 further has a digit portion 720" for buffering a plurality of up to 128 bytes of port signaling information message units from the processor bus 725 to a selected one of the X.21 data ports 15. The reading out of the bytes of call establishment message units from the transmit buffer 720 to an X.21 data port 15 is carried out at the respective data rate for that data port.

The control module 760 shown in FIG. 8, has a port select input connected to the line 78 from the switch control memory 50 in the digital switch of the controller 22, for receiving the same port select signals which are also used to select the data port 15 for connection to the transmit bus 44A and to the receive bus 44B. The control module 760 has a control input connected through the peripheral interface 727 to the processor bus 725 of the microprocessor 716. The control module 760 has a first address output connected to the address input of the receive buffer 710 and a second address output connected to the address input of the transmit buffer 720, for controlling the writing and reading operations in the receive buffer 710 and in the transmit buffer 720.

The microprocessor 716, shown in FIG. 8, receives the currently buffered byte of port state control message unit from the scan portion 710' of the receive buffer 710 for each of the X.21 data ports 15. The microprocessor 716 will then compute the next X.21 control state for each of the ports 15. The microprocessor 716 will then provide control signals to the control module 760 in response to the computed next control state for a given data port 15, for controlling the writing of the plurality of bytes of port signaling information message units into the digit portion 710" of the receive buffer 710 from that selected one of the X.21 data ports 15, as call establishment signals.

The microprocessor 716 will provide control signals to the control module 760 in response to the computed next control state, for controlling the transfer of the plurality of bytes of port signaling information units from the digit portion 710" of the receive buffer 710 through the peripheral interface 727 to the processor bus 725 and then through the processor interface 729 to the control processor 32 as call establishment signals. The control processor 32 will then set up the call between this communications controller 22 and another communications controller, in a manner similar to that described in the Brickman, et al. patent referenced above.

When the control processor 32 wants to transfer X.21 call establishment signals from itself back to the X.21 data port 15, as for example when call progress messages are to be transmitted back to the calling data port, the microprocessor 716 will output a byte of port state control message unit to the scan portion 720' of the transmit buffer 720 for the intended port 15, in response to a computed next control state for that port. The microprocessor 716 will provide control signals to the control module 760 in response to the computed next control states, for controlling the transfer of a plurality of bytes of port signaling information message units into the digit portion 720" of the transmit buffer 720 from the control processor 32. The switch control memory 50 of the digital switch will then control the transfer of the plurality of bytes of port signaling information message units from the digit portion 720" of the transmit buffer 720 over the receive bus 44B to the selected one of the X.21 data ports 15 at the respective data rate of that data port. In this manner, call establishment signals originating from the control processor 32 and directed to the X.21 data port 15 can be transferred to the data port 15 at the respective port data rate.

Detailed Description of the X.21 Switching System

Figure 6:
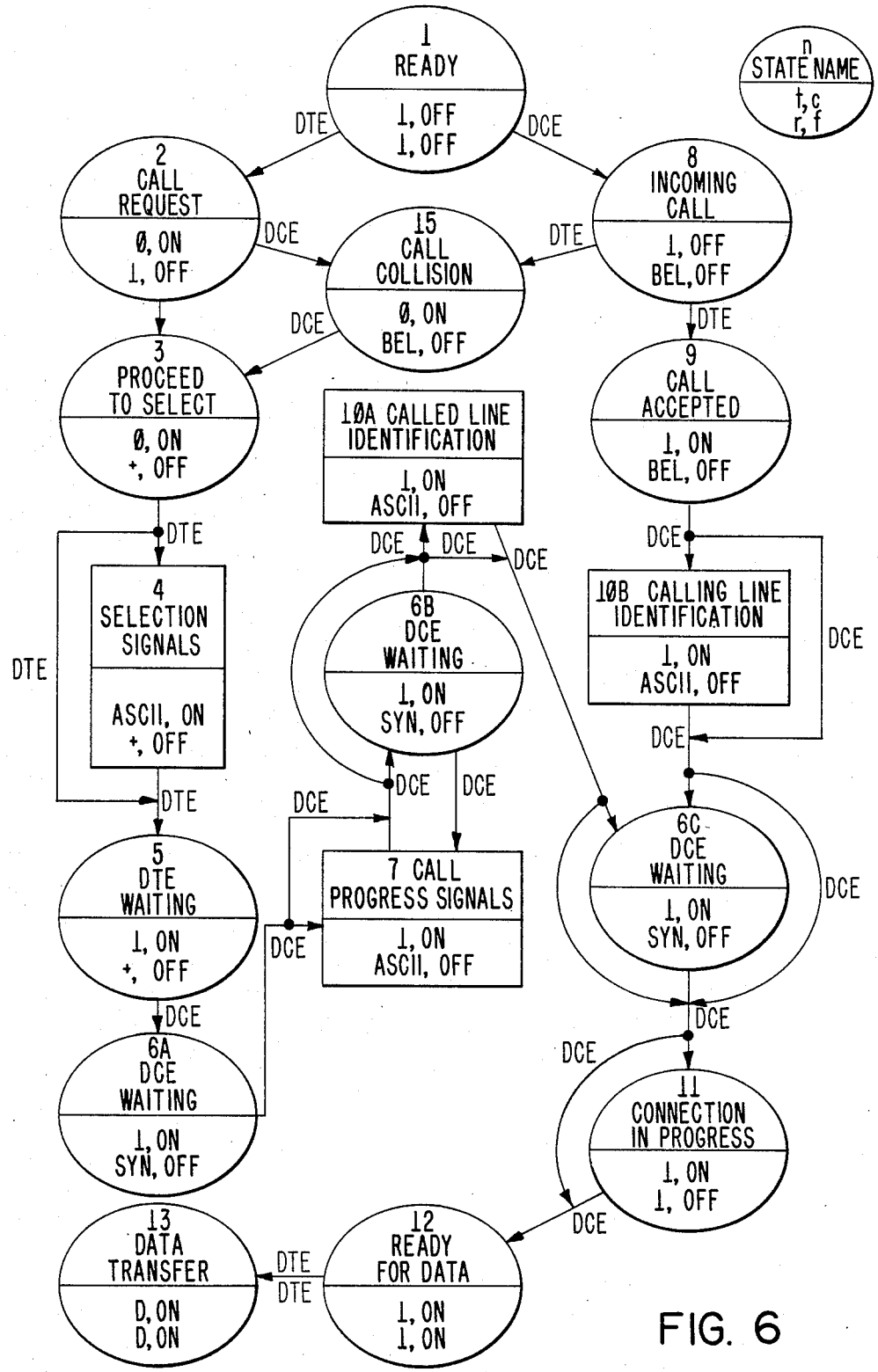
FIG. 6 is a state diagram of the call establishment phase for circuit switched service using the X.21 standard.

The X.21 switching system must carry out the predefined sequence of call establishment states shown in FIGS. 6 and 7 in order to provide for the orderly connection and disconnection of an X.21 DTE to an X.21 DCE. In order to accomplish this, the X.21 state diagrams shown in FIGS. 6 and 7 are embodied in the stored program of the microprocessor 716. The microprocessor 716 takes the existing state for each of the X.21 data ports 15 and computes the next state for that data port, based upon demands for service by the DTE connected to that data port or based upon demands by the control processor 32 for the communication of call establishment signals to that data port 15. Thus the microprocessor 716 is shared in a multiplexed manner among all of the 128 X.21 data ports which can be serviced by the system.

Figure 11:
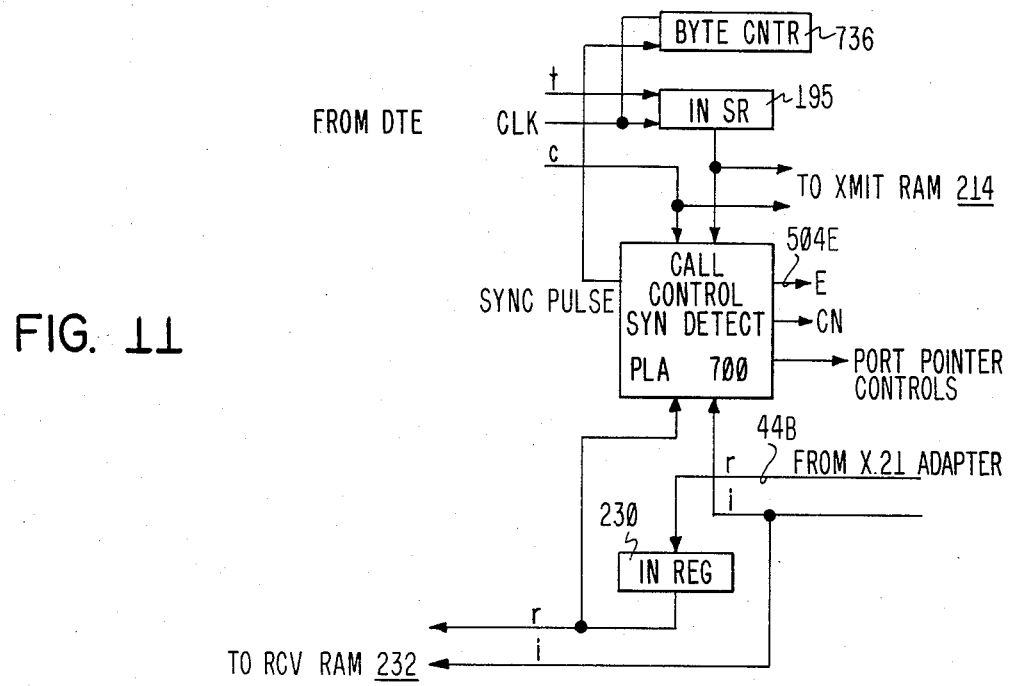
FIG. 11 is a more detailed illustration of the interface logic 700.

In order to alleviate the computational load on the microprocessor 716 for interpreting bytes of control information input from the DTE connected to a particular data port, the X.21 control state diagrams of FIGS. 6 and 7 are also embodied in an interface logic unit 700 which resides in each data port 15. Each interface logic unit 700, shown in greater detail in FIG. 11, is a programmed logic array (PLA) which has an input connected to the t line and the c line from the DTE and which has an output connected to the r line and the i line to the DTE. Collectively, these four lines are referred to as lines 703 and are connected to the DTE 701. The interface logic 700 in each of the data ports 15 also has an E-lead output 504E which is connected to the E-lead input of the call processor 28 as is shown in FIG. 1. The operation of an E-lead is described in detail in the Brickman, et al. patent referenced above. The E-lead output signal from the interface logic 700 to the call processor 28 is in response to an off-hook signal received by the interface logic 700 from the DTE 701. This alerts the call processor 28 to the initial off-hook condition of the DTE and in response, the call processor will alert the control processor 32 that this particular data port 15 is requesting service. The control processor 32 will then set up appropriate SCM words in the switch control memory 50 in order to start the periodic select signals on line 78 to the requesting data port, in the same manner as is described in the Alvarez, et al. patent and in the Brickman, et al. patent referenced above. The control processor 32 loads a plurality of $N_j$ control words into the switch control memory 50 for a particular data port 15. As the switch control memory 50 is scanned, each of the $N_j$ control words issues a port select signal over line 78 to the port 15 and to the receive buffer 710 and the transmit buffer 720, when scanned by the scanner 70. When a plurality of bytes of call establishment signals are to be transferred from the data port 15 to the receive buffer 710 or when they are to be transferred from the transmit buffer 720 to the data port 15, the data rate will be $R_j$ characteristic of the data port. The relationship between $N_j$ and $R_j$ is defined in the Alvarez, et al. and the Brickman, et al. patents referenced above.

Figure 3A:
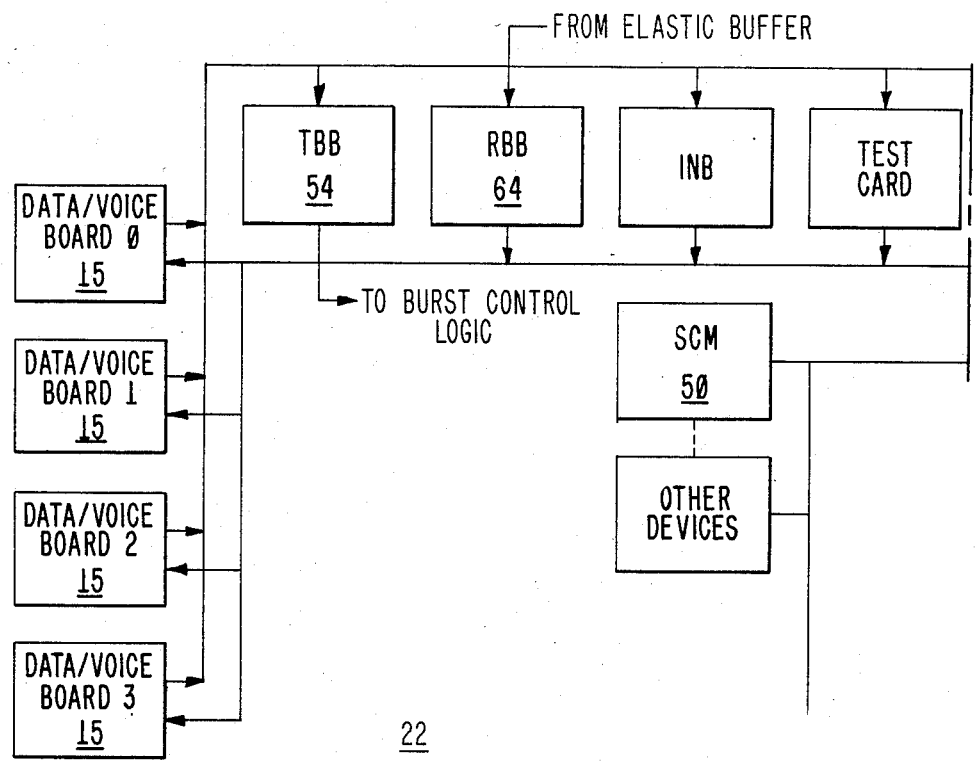
FIGS. 3, 3a and 3b are the satellite communinations controller which includes the X.21 adapter.
Figure 3:
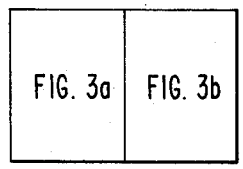
Figure 3B:
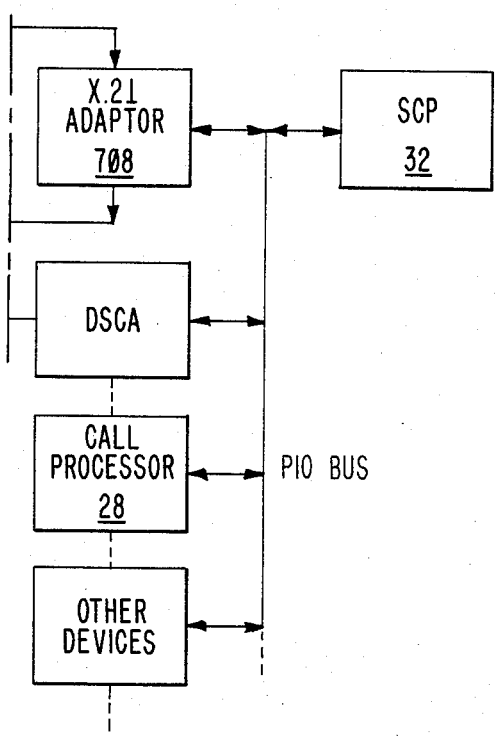

The microprocessor 716 and its associated components are referred in their aggregate as the SCP bus interface 750 shown in FIG. 5. The SCP bus interface 750, the receive buffer 710 and the transmit buffer 720 are referred to in their aggregate as the X.21 adapter 708, as is seen in FIG. 1. FIG. 1 shows the interconnection of one of the data ports 15 with the X.21 adapter 708 and the digital switch 30. FIG. 3 shows a functional block diagram of the relationship of several data ports 15 with the digital switch 30, the X.21 708, and other components in the communications controller 22.

An example of one of the X.21 data ports 15 is shown in FIG. 9. The interface logic 700 for the data port 15 is shown in greater detail in FIG. 11. An off-hook indication from the DTE conveyed over the t line to the interface logic 700 will result in the outputting of an E-lead signal on line 504E to the call processor 28, as previously discussed. This is represented by the transition from state 1 to state 2 in the X.21 state diagram of FIG. 6, wherein the DTE 701 of FIG. 2 has indicated over lines 703 to the communications controller (SCC) 22 that it is making a call request.

After the call processor 28 has identified the particular data port 15 as having received the call request from the DTE and after the control processor 32 has allocated SCM words in the switch control memory 50 to enable the periodic selection of the data port 15 which has received the call request, the communications controller 22 will want to signal to the DTE a proceed-to-select signal which is a transition from state 2 to state 3 in the state diagram of FIG. 6. This is achieved by the control processor 32 indicating over the processor bus 725 to the microprocessor 716 in FIG. 8, that the proceed-to-select signal should be transmitted to the data port. The microprocessor 716 computes the new state 3 and then outputs a control signal to the control module 760 to enable the loading of an appropriate port state control byte in the scan portion 720' of the transmit buffer 720. The scan portion 720' is divided into 128 single byte location which are respectively addressed by the port select address generated by the microprocessor.

Reference is now made to FIG. 12 which illustrates in detail the control module 760. There it is seen that the port ID register 748 is loaded from the microprocessor 716 with the port select address and that value is output to the address input of the transmit buffer 720. The byte of information which serves to indicate the proceed-to-select control state is the ASCII character for "plus." Thereafter, in the read mode for the transmit buffer 720, when the switch control memory 50 scans through the SCM word corresponding to the port select for the intended X.21 data port 15 to which the proceed-to-select byte is to be transmitted, that port select value from the SCM 50 is input on line 78 to the address input of the transmit buffer 720, and the port state control byte is read out of the scan portion 720' onto the receive bus 44B and is input over the r line and the i line to the X.21 data port 15.

Referring again to the state diagram of FIG. 6, when the DTE is ready to send its selection signals representing, for example the telephone number of the called party, a series of ASCII characters are input on the t line to the data port 15 and this is interpreted by the interface logic 700 as selection signals which are to be passed on the t line to the transmit bus 44A to the receive buffer 710, to be written in the digit portion 710''. The microprocessor 716 turns the ASCII mode bit on which sets the flip-flop 756 in FIG. 12, conditioning the AND gate 754 which will provide an enable signal when the comparator 752 is satisfied. The microprocessor loads the port ID register 748 with the port select address for the X.21 data port 15 from which the port signaling information is to be received. When the switch control memory 50 arrives at the SCM word containing the same port select value on line 78, the comparator 752 is satisfied and thus the AND gate 754 will become satisfied. A pulse is output from the AND gate 754 which passes through the AND gate 758 to the ASCII counter 746. The ASCII counter 746 starts counting from the starting location in the digit portion 710'' of the receive buffer 710 and sequential locations in the digit portions 710'' are addressed by the control module 760 as each consecutive byte of the port signaling information is transmitted from the data port 15 over the transmit bus 44A to the receive buffer 710. After the full complement of bytes of port signaling information are written into the digit portion 710'' of the receive buffer 710, the microprocessor 716 will oversee the readout of the digit portion 710'' so as to transfer the port signaling information over the processor bus 725 to the control processor 32 as call establishment signals. The microprocessor 716 knows that the transfer is completed by virtue of the fact that the next location accessed from the digit portion 710'' will be invalid, since after a valid entry is read out it is immediately invalidated. At that point the release request line resets latch 756.

The DTE 701 can indicate that it is in a waiting state corresponding to state 5 of FIG. 6, by outputting bytes containing all ones on the t line. These bytes are transferred to the scan portion 710' of the receive buffer 710 over the transmit bus 44A when the switch control memory 50 outputs a select signal on line 78 to the data port. The control module 760 will scan the scan portion 710' of the receive buffer 710 monitoring the contents of the buffer for valid messages, and will transfer the port state control byte to the microprocessor 716 for analysis and computation of the next control state.

Responses from the control processor 32 through the transmit buffer 720 to a data port 15 are carried out in essentially the same manner by the microprocessor 716 and the control module 760, as was described for transfers from the data port 15 through the receive buffer 710, above.

OPERATION OF THE INVENTION

Upon detecting a call request, state 2 of FIG. 6, the interface logic 700 in the data port 15 presents an "off hook" indication via the E&M interface 504 between the data port 15 and call processor 28. The call processor 28 interrupts the SCP 32 which sets up the SCM location in the SCM 50 associated with the port 15 in question and allows the digital switch 30 to select that port 15.

The digital data port 15 is shown in FIGS. 1, 9 and 11. Control logic implemented in the PLA 700 computes the state of the port 15 based on the (t,c) and (r,i) signal lines.

Figure 4A:
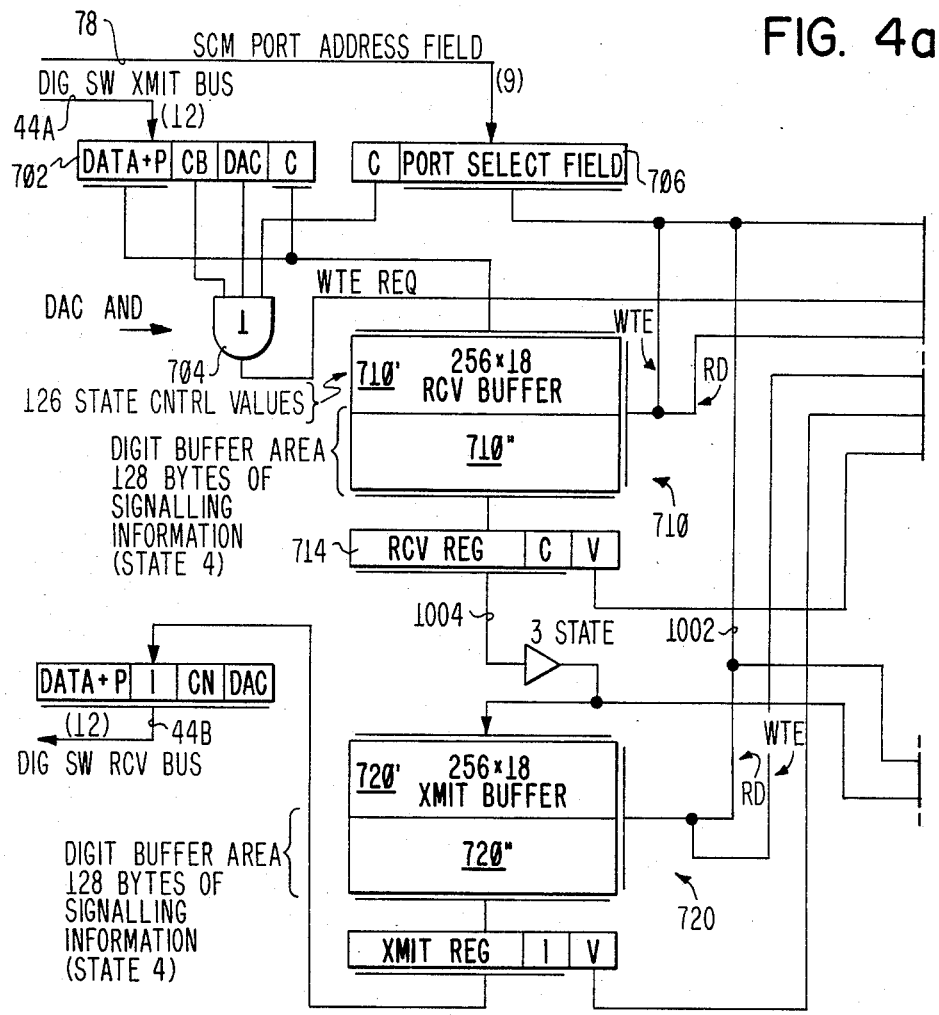
Figure 4B:
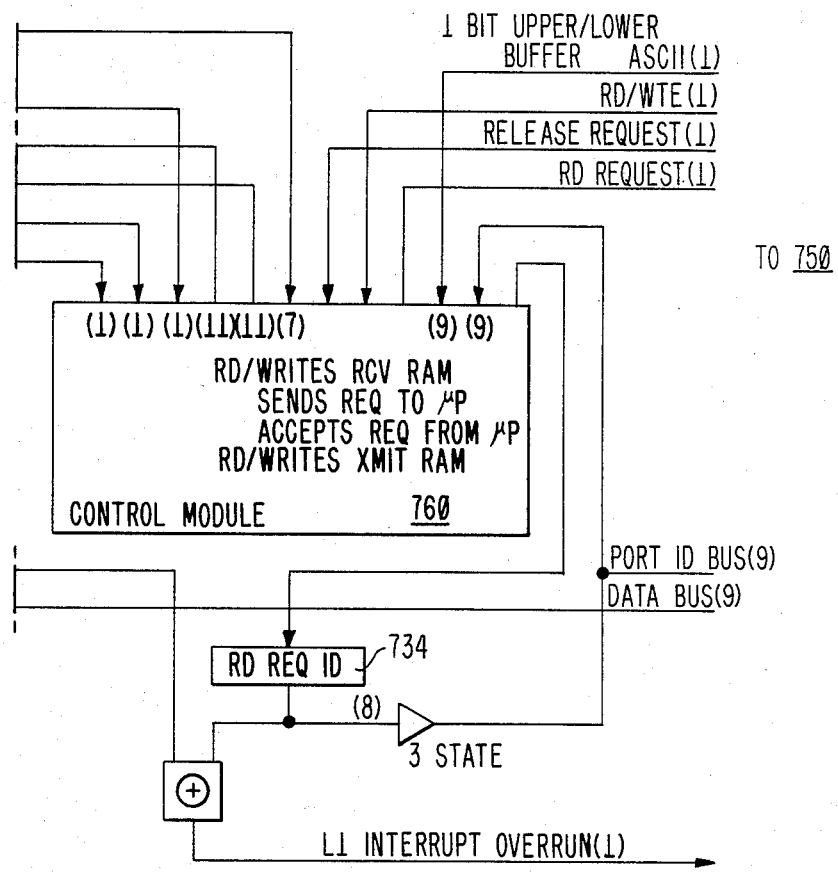
Figure 10:
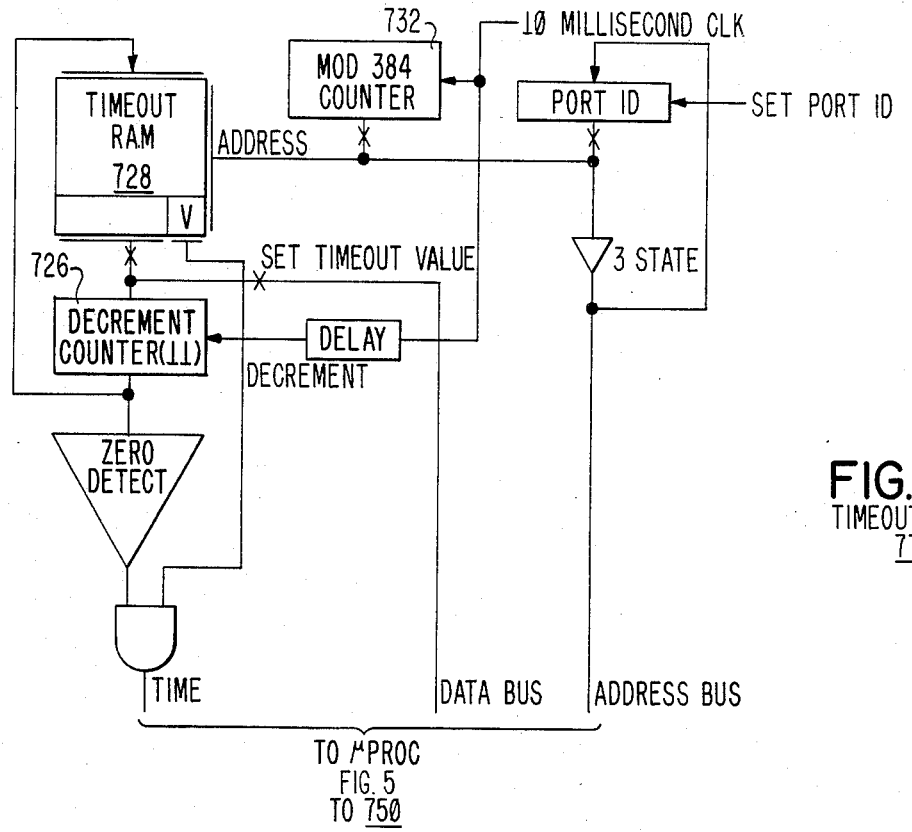
FIG. 10 is a functional block diagram of the time-out RAM in the X.21 switching system.

1. Thus, in state 2 the port 15 is placed in control mode. In control mode the XMIT RAM read and write pointers 260 and 258 are kept pointed to the same RAM location, so that if the external device 701 sends the same byte of information to the port 15 the data activity compression (DAC) bit will turn on after the second digital switch 30 access to the port 15 and the X.21 adapter 708 will not be burdened with processing redundant information.
2. Thus, the DAC bit, which in data mode is used to inhibit transmission of repetitive data (as described in the Brickman, et al. and Alvarez, et al. patents), is used here to save adapter 708 bandwidth.
3. When the digital switch 30 reads the first byte of information from the port 15 in state 2 and for every transfer of information in control mode the port 15 appends a control bit (cn) on line 712 to the existing data field, so that the information will be used by the X.21 adapter 708 rather than by the TBB 54 or other facilities attached to the transmit bus 44A.
4. As shown in FIG. 4, when the port 15 is selected the adapter 708 latches the select port field from line 78 in register 706. If the port control bit (cn) is on and the DAC bit is off, as determined by AND gate 704, the data is loaded immediately in the RCV buffer 710 of the X.21 adapter 708 under the control of module 760 and a valid bit appended to that entry. That entry contains the bits of the (t) field and the X.21 control bit (c) from line 712.
5. Data written into the RCV buffer 710 of the X.21 adapter 708 has priority over data read from that RAM 710 by control module 760.
6. Control module 760 scans the RCV buffer 710 to determine whether there are requests to the SCP 32 pending. When an entry is read with the valid bit on, the contents of the entry are stored in the receive register 714, the entry is invalidated, and a request is made to the X.21 interface microprocessor 716 shown in FIG. 5. The entry is invalidated in RAM 710 so that when it is revisited, a request to the microprocessor 716 is made only if there is new information to be processed. Note that the address of an entry equals the port select ID in register 706.
7. The request to the microprocessor 716 is accompanied with the port select ID which identifies the port 15 as well as the data field which comprises the X.21 t and c fields.
8. The microprocessor 716 then releases the request pending in control module 760 of FIG. 4, and accesses the X.21 state RAM 718 where the state of the port 15 is stored. It also loads the SCP input register 722, with X.21 data and port ID. The new state is computed in the microprocessor 716 and stored back into the X.21 RAM 718. At initial program load (IPL) time the X.21 RAM 718 is set to X.21 state 1 (ready state).
9. Assume that the new state for the port 15 in this example is state 2 (call request) shown in FIG. 6.
10. The microprocessor 716 generates a request to the SCP 32 to look at the information in the SCP input registers 722.
11. While the SCP 32 determines whether it can process the call request for that port, control module 760 accesses the next address in the RCV buffer 710 and steps 6 and 7 are repeated. Note that if the entry accessed has the valid bit off, the following entry is accessed.
12. The SCP 32 returns "proceed to select" (X.21 state 3 of FIG. 6) and releases the pending request in the microprocessor 716. The port ID and data are latched in the SCP out register 724.
13. The microprocessor 716 accepts the request from the SCP 32, accesses the X.21 RAM 718 with the port ID latched in the SCP out register 724 and computes the state of the port 15.
14. The microprocessor 716 sends a WTE write request to control module 760.
15. Control module 760 writes the data from the SCP out register 724 data field into the X.21 XMIT buffer 720 and turns on the valid bit associated with that entry.
16. Within 250 microseconds the select port field 78 from the SCM 50 accesses that entry and places the data (only if valid bit on) on the digital switch RCV bus 44B.
17. Control module 760 writes back that address if the valid bit was on and turns off the valid bit.
18. The data destined for the port 15 selected is latched into the port receive register 230 shown on FIG. 9.
19. In 13 above, the microprocessor 716 computes the state of the port 15. In some cases a time-out has to be initiated to insure that the external device 701 responds within the time defined by the X.21 protocol. The time-out process is implemented as follows:
20. When the SCC 22 has to invoke a time-out associated with a given state, the microprocessor 716 loads an 11 bit time-out value at the address indicated by the port ID. As shown in FIG. 10, the time-out value is loaded in the decrement counter 726 and then loaded in the time-out RAM 728. A modulo 384 counter 732 incremented with a 8 microsecond clock accesses the time-out RAM 728 every 8 microseconds with the address in the modulo 384 counter and decrements that entry by one in the decrement counter 726 if the valid bit is on. If the valid bit is off, the entry is ignored.
21. If the valid bit is on and the time-out value equals zero, the microprocessor 716 is interrupted. The modulo 384 counter 732 value determines the port ID. The microprocessor 716 alerts the SCP 32 informing it that the job in question has not responded in time. The SCP 32 responds and the appropriate response as shown in FIG. 8 is sent to the port 15. The implementation mechanism for transferring information to the port 15 is as described in steps 14 through 18 above.
22. If the valid bit is on and the time-out value does not equal zero, the decremented value is loaded in the time-out RAM 728 at the address indicated by the modulo 384 counter 732.
23. Whenever the microprocessor 716 computes a state that terminates a time-out, it accesses the time-out RAM 718 asynchronously via the port ID portion of the SCP input REG 722 and turns off the valid bit for that entry. The X.21 time-outs for a maximum of 384 ports can be monitored at X.21 signaling rates for speeds varying from 2.4 Kbps to 6.31 Mbps with a minimum of participation by the SCC control processor SCP 32. With an 11 bit time-out value and an 8 microsecond clock, a maximum time-out of 6.29 seconds can be measured.

24. Steps 12 through 18 above described how data from the SCP 32 is written to the data port 15. In this case the control data was "proceed to select."

25. When the data port 15 receives this data it enters state 3 (FIG. 6) and sends the "proceed to select" message to the external device 701. In state 3 the port 15 waits for the SYN characters which precede the selection signals from the external device 701. Once two SYN characters are received and recognized by the data port 15, the input shift register 195 for the port 15 is lined up on byte boundaries. The XMIT RAM read pointer 260 is prevented from incrementing. This results in the selected data having the DAC bit on since the same byte of data is continuously read and therefore is ignored by the adapter 708.

26. When the first selection digit is received by the port 15 it is written into the XMIT RAM 214. The write (WTE) pointer 258 (FIG. 9) is allowed to increment, and every selection digit is written in the RAM 214. Note that the selection digits are written in the RAM 214 at the byte rate of the attached device 701. This rate can vary from 2.4 Kbps to 6.312 Mbps. A maximum of 126 selection digits can be written plus two bytes of marks before the write pointer 258 is prevented from incrementing. Note that the bytes of marks are provided by the external device 701 in state 5 (DTE waiting) of FIG. 6.

27. The port 15 recognizes the fact that the selection digits have been received and enters a state whereby the DAC bit is reset, allowing the next select to the port 15 to read a code word advising the adapter 708 that selection digits are available. This code word is processed as in steps 4 through 7 above. The microprocessor 716 is interrupted and returns a code word to the port 15 via steps 13 through 18.

28. The port 15 then allows the transmit RAM read pointer 260 to increment with every select received and transmits the selection digits to the adapter 708 until the read pointer 760 equals the write pointer 258, at which time the DAC bit turns on because the two last bytes loaded in the port transmit RAM 214 were mark bytes corresponding to the DTE waiting state (state 5, FIG. 6).

29. Note that when the adapter 708 sends the code word to the port 15 enabling it to send selection digits, the address of that port 15 is kept in the read request ID register 748 in FIG. 12 so that when the first selection digit from the port 15 arrives, a match occurs between the ID in the port selected field 78 and the read request ID register 748, causing the digits to be loaded in the digital buffer area of the adapter RCV buffer 710 (FIG. 4). On the select following the last digit received, the DAC bit turns on signaling control module 760 to interrupt the microprocessor 716. The microprocessor 716 then sends a code word to control module 760 to read the digit buffer area of receive buffer 710. The data is sent directly from receive buffer 710" to the SCP 32 via a cycle steal mechanism in less time than the digital switch scan time of 250 microseconds. Note that only one port 15 at a time has access to the digit buffer area in the receive buffer 710.

30. Call progress digits from the SCP 32 to the port 15 follow a similar path except that the digits are loaded in the adapter 708 transmit buffer 720 prior to transmission to the port 15. With reception of the first call progress digit, the port 15 inhibits the receive RAM read pointer 264 from incrementing until all the digits are loaded. As soon as the first DAC bit is received from the adapter 708, the read pointer 264 is allowed to increment and pass the call progress digits to the interface 700. Note that all digits are read by the port 15 when the write pointer 256 equals the read pointer 264.

31. After all the signaling digits between the external device 701 and the port 15 have been transmitted, the SCP 32 sends a code to the port 15 advising the external device 701 that data transfer can begin. The port 15 is then put into the data mode and operates as previously disclosed in the Brickman, et al. and Alvarez, et al. patents referenced above.

In summary, the invention establishes connections between remote stations using the X.21 protocol and achieves this using the existing SCC architecture with the addition of a microprocessor based X.21 adapter 708 and modifications to the existing data port design. The system will handle call establishment for up to 126 ports at any speed up to 6.312 Mbps provided the aggregate data rate does not exceed the digital switch bandwidth of 12.288 Mbps.

The invention provides the connection establishment for a large number of data ports using the X.21 in-band signaling protocol. Within the context of a satellite communications system the invention represents several advantages to be listed below.

1. It adapts the X.21 protocol for use in satellite communication systems.
2. It enables ports of different speeds varying from 2.4 Kbps to 6.312 Mbps to signal at their normal communicating rate.
3. It handles call establishment for up to 126 ports and uses only one (X.21) adapter 708 to establish call connections.
4. It requires no special comparison circuitry to transfer information between the ports and the X.21 adapter 708. Instead the existing digital switch polling scheme is used to transfer X.21 control information. This results in considerable hardware savings.
5. It implements the X.21 time-outs in a central location rather than at each individual port which results in significant hardware savings.
6. The call arrival rate handling is limited only by the ability of the satellite communications processor to handle calls, not by the X.21 adapter 708 or the data port 15.
7. The off-line time-out computation in the X.21 adapter minimizes SCP processor interrupt rate and frees the SCP 32 from the burden of keeping track of time-outs for individual ports 15.
8. The X.21 control programmable logic array (PLA) chip 700 is located on the data port 15 card and is used to control the X.21 finite state transitions of FIGS. 6 and 7 as well as the necessary byte synchronization to the DTE 701. The chip 700 represents a very dense and efficient use of LSI hardware. Data as well as control information being analyzed in the same PLA 700 contributes to its efficiency.

9. It utilizes the existing data port RAMs 214 and 232 to process the additional X.21 function. These RAMs now handle X.21 signaling and control information in addition to the existing slip and synchronization functions described in the above referenced Alvarez, et al. and Brickman, et al. patents.

Although a specific embodiment of the invention has been disclosed it will be understood by those of skill in the art that the foregoing and other changes in form and details may be made therein without departing from the spirit and the scope of the invention.

We claim:

1. In a communications controller having a plurality of X.21 data ports each connected to "t" and "c" input lines from a respective DTE and each connected to "r" and "i" output lines to said respective DTE, said data ports receiving periodic select signals from a digital switch in said controller to transfer message units to and from said data ports at respective port data rates, apparatus for transferring X.21 call establishment signals between said data ports and a control processor, comprising:

a receive buffer having a data input connected to a transmit bus connected in common through said data ports to said "t" and "c" lines, having an address input and a data output, said receive buffer being divided into a scan portion for buffering a port state control message unit from each of said ports and a digit portion for buffering a plurality of port signaling information message units from a selected one of said ports at said respective port data rate;

a transmit buffer having a data input, having an address input and having a data output connected to a receive bus connected in common through said data ports to said "r" and "i" lines, said transmit buffer being divided into a scan portion for buffering a port state control message unit to each of said ports and a digit portion for buffering a plurality of port signaling information message units to a selected one of said ports at said respective port data rate;

a cotrol module having an input connected to said digital switch for receiving said port select signals, having a control input and having a first address output to said address input of said receive buffer and a second address output to said address input of said transmit buffer, for controlling the writing and reading of said port state control message units and said port signaling information message units in said transmit buffer and in said receive buffer;

a microprocessor connected by means of a processor bus to said data output of said receive buffer, to said data input of said transmit buffer, to said control module and to said control processor, for receiving the currently buffered port state control message unit from said scan portion of said receive buffer for each of said ports and computing the next X.21 control state for each of said ports;

said microporcessor providing control signals to said control module in response to said computed next control state, for controlling the writing of said plurality of port signaling information message units into said digit portion of said receive buffer from a selected one of said ports as call establishment signals;

said microprocessor providing control signals to said control module in response to said computed next control state, for controlling the transfer of said plurality of port signaling information message units from said digit portion of said receive buffer over said processor bus to said control processor as call establishment signals;

whereby call establishment can be achieved for X.21 data ports at said respective port data rates.

2. The apparatus of claim 1, which further comprises:

said microprocessor outputting a port state control message unit to said scan portion of said transmit buffer for each of said ports in response to said computed next control state for each of said ports;

said microprocessor providing control signals to said control module in response to said computed next control state, for controlling the transfer of a plurality of port signaling information message units into said digit portion of said transmit buffer from said control processor as call establishment signals;

said digital switch controlling the transfer of said plurality of port signaling information message units from said digit portion of said transmit buffer over said receive bus to a selected one of said ports at said respective data rate as call establishment signals;

whereby call establishment can be achieved for X.21 data ports at said respective port data rates.

3. In a communications controller having a plurality of X.21 data ports each connected to "t" and "c" input lines from a respective DTE and each connected to "r" and "i" output lines to said respective DTE, said data ports receiving periodic select signals to transfer message units to and from said data ports at respective port data rates, apparatus for transferring X.21 call establishment signals between said data ports and a control processor, comprising:

a receive buffer having a data input connected to a transmit bus connected in common through said data ports to said "t" and "c" lines, having an address input and a data output, said receive buffer being divided into a scan portion for buffering a port state control message unit from each of said ports and a digit portion for buffering a plurality of port signaling information message units from a selected one of said ports at said respective port data rate;

a transmit buffer having a data input, having an address input and having a data output connected to a receive bus connected in common through said data ports to said "r" and "i" lines, said transmit buffer being divided into a scan portion for buffering a port state control message unit to each of said ports and a digit portion for buffering a plurality of port signaling information message units to a selected one of said ports at said respective port data rate;

a control means having an input for receiving said port select signals, having a control input and having a first address output to said address input of said receive buffer and a second address output to said address input of said transmit buffer, for controlling the writing and reading of said port state control message units and said port signaling information message units in said transmit buffer and in said receive buffer;

said control means connected by means of a processor bus to said data output of said receive buffer, to said data input of said transmit buffer, and to said control processor, for receiving the currently buffered port state control message unit from said scan portion of said receive buffer for each of said ports and computing the next X.21 control state for each of said ports;

said control means in response to said computed next control state, controlling the writing of said plurality of port signaling information message units into said digit portion of said receive buffer from a selected one of said ports as call establishment signals;

said control means in response to said computed next control state, controlling the transfer of said plurality of port signaling information message units from said digit portion of said receive buffer over said processor bus to said control processor as call establishment signals;

whereby call establishment can be achieved for X.21 data ports at said respective port data rates.

4. The apparatus of claim 3, which further comprises:

said control means outputting a port state control message unit to said scan portion of said transmit buffer for each of said ports in response to said computed next control state for each of said ports;

said control means in response to said computed next control state, controlling the transfer of a plurality of port signaling information message units into said digit portion of said transmit buffer from said control processor as call establishment signals;

whereby said plurality of port signaling information message units can be made available for transfer from said digit portion of said transmit buffer over said receive bus to a selected one of said ports at said respective data rate as call establishment signals.

5. In a TDMA communications controller having a plurality of data ports with outputs connected to a time division transmit bus and inputs connected to a time division receive bus, having a transmit data buffer with a traffic data input connected to said transmit bus and a receive data buffer with a traffic data output connected to said receive bus, and having a switch control memory which periodically scans SCM words containing a port select field for selecting said data ports and containing a data partition address field for addressing said receive data buffer and said transmit data buffer, an X.21 switching system for connecting said controller to a data terminal equipment, comprising:

interface logic in one of said data ports, having interface lines which include a "c" input line and a "t" input line from said data terminal equipment for receiving X.21 control and traffic data signals, respectively, therefrom, said interface lines further including an "i" output line and an "r" output line to said data terminal equipment for transmitting X.21 control and traffic data signals, respectively, thereto;

said interface logic further including an E-lead output to a control processor, for indicating an off-hook condition thereto when said interface lines assume a call request control state, said control processor in response thereto, loading one of said SCM words into said switch control memory having said port select field correspond to said one port and said data partition address field correspond to a traffic data buffering location in said transmit data buffer and in said receive data buffer;

a microprocessor in said controller, connected to said control processor, for receiving a proceed-to-select command for said one port from said control processor, said microprocessor computing a proceed-to-select control state value which is stored in a port state control value memory associated therewith;

a transmit control buffer in said controller, having a control data input connected to said microprocessor and a control data output connected to said receive bus, having a first portion for buffering port state control values for a plurality of said data ports and having a second portion for selectively buffering signaling information for said one port, buffering operations in said first and second portions thereof being controlled by a buffer control input from said microprocessor, said proceed-to-select control state value being transferred by said microprocessor from said port state control value memory through said first portion of said transmit control buffer and over said receive bus to said interface logic, said interface logic outputting a proceed-to-select signal over said interface lines to said data terminal equipment;

a receive control buffer in said controller, having a control data input connected to said transmit bus and a control data output connected to said microprocessor, having a first portion for buffering port state control values for a plurality of said data ports and having a second portion for selectively buffering signaling information for said one port, buffering operations in said first and second portions thereof being controlled by a buffer control input from said microprocessor;

said data terminal equipment inputting selection signals over said interface lines, which signals are transferred over said transmit bus under the control of said interface logic, which signals are transferred through said second portion of said receive control buffer to said control processor for call establishment;

said interface logic outputting a ready-for-data state on said interface lines and controlling the transfer of data from said data terminal equipment over said transmit bus to said transmit data buffer and controlling the transfer of data from said receive data buffer over said receive bus to said data terminal equipment.

6. In a TDMA communications controller having a plurality of data ports with outputs connected to a time division transmit bus and inputs connected to a time division receive bus, having a transmit data buffer with a traffic data input connected to said transmit bus and a receive data buffer with a traffic data output connected to said receive bus, and having a switch control memory which periodically scans SCM words containing a port select field for selecting said data ports and containing a data partition address field for addressing said receive data buffer and said transmit data buffer, an X.21 switching method for connecting said controller to a data terminal equipment, comprising the steps of:

receiving X.21 control and traffic data signals, with an interface logic in one of said data ports, having interface lines which respectively include a "c" input line and a "t" input line from said data terminal equipment, said interface lines further including an "i" output line and an "r" output line to said data terminal equipment for transmitting X.21 control and traffic data signals, respectively, thereto;

indicating an off-hook condition with said interface logic using an E-lead output to a control processor, when said interface lines assume a call request control state, said control processor in response thereto, loading one of said SCM words into said switch control memory having said port select field correspond to said one port and said data partition address field correspond to a traffic data buffering location in said transmit data buffer and in said receive data buffer;

receiving a proceed-to-select command for said one port with a microprocessor in said controller, connected to said control processor, said microprocessor computing a proceed-to-select control state value which is stored in a port state control value memory associated therewith;

buffering port state control values for a plurality of said data ports with a first portion of a transmit control buffer in said controller, having a control data input connected to said microprocessor and a control data output connected to said receive bus;

selectively buffering signaling information for said one portion a second portion of said transmit control buffer;

said first and second portions thereof being controlled by a buffer control input from said microprocessor;

transferring said proceed-to-select control state value by said microprocessor from said port state control value memory through said first portion of said transmit control buffer and over said receive bus to said interface logic, said interface logic outputting a proceed-to-select signal over said interface lines to said data terminal equipment;

buffering port state control values for a plurality of said data ports with a first portion of a receive control buffer in said controller, having a control data input connected to said transmit bus and a control data output connected to said microprocessor;

selectively buffering signaling information for said one port with a second portion of said receive control buffer, buffering operations in said first and second portions thereof being controlled by a buffer control input from said microprocessor;

inputting selection signals over said interface lines with said data terminal equipment, which signals are transferred over said transmit bus under the control of said interface logic, which signals are transferred through said second portion of said receive control buffer to said control processor for call establishment;

outputting a ready-for-data state on said interface lines with said interface logic and controlling the transfer of data from said data terminal equipment over said transmit bus to said transmit data buffer and controlling the transfer of data from said receive data buffer over said receive bus to said data terminal equipment.

7. In a communications controller having a plurality of X.21 data ports each connected to "t" and "c" input lines from a respective DTE and each connected to "r" and "i" output lines to said respective DTE, said data ports receiving periodic select signals from a digital switch in said controller to transfer message units to and from said data ports at respective port data rates, a method for transferring X.21 call establishment signals between said data ports and a control processor, comprising the steps of:

buffering a port state control message unit from each of said ports with a scan portion of a receive buffer having a data input connected to a transmit bus connected in common through said data ports to said "t" and "c" lines, having an address input and a data output;

buffering a plurality of port signaling information message units from a selected one of said ports at said respective port data rate in a digit portion of said receive buffer;

buffering a port state control message unit to each of said ports with a scan portion of a transmit buffer having a data input, having an address input and having a data output connected to a receive bus connected in common through said data ports to said "r" and "i" lines, said transmit buffer being divided into a scan portion;

buffering a plurality of port signaling information message units to a selected one of said ports at said respective port data rate in a digit portion of said transmit buffer;

controlling the writing and reading of said port state control message units and said port signaling information message units in said transmit buffer and in said receive buffer with a control module having an input connected to said digital switch for receiving said port select signals, having a control input and having a first address output to said address input of said receive buffer and a second address output to said address input of said transmit buffer;

computing the next X.21 control state for each of said ports using the currently buffered port state control message unit from said scan portion of said receive buffer for each of said ports, with a microprocessor connected by means of a processor bus to said data output of said receive buffer, to said data input of said transmit buffer, to said control module and to said control processor;

providing control signals from said microprocessor to said control module in response to said computed next control state, for controlling the writing of said plurality of port signaling information message units into said digit portion of said receive buffer from a selected one of said ports as call establishment signals;

providing control signals from said microporcessor to said control module in response to said computed next control state, for controlling the transfer of said plurality of port signaling information message units from said digit portion of said receive buffer over said processor bus to said control processor as call establishment signals;

whereby call establishment can be achieved for X.21 data ports at said respective port data rates.

8. The method of claim 7, which further comprises the steps of:

outputting from said microprocessor a port state control message unit to said scan portion of said transmit buffer for each of said ports in response to said computed next control state for each of said ports;

providing control signals from said microprocessor to said control module in to said computed next control state, for controlling the transfer of a plurality of port signaling information message units into said digit portion of said transmit buffer from said control processor as call establishment signals;

controlling the transfer of said plurality of port signaling information message units with said digital switch, from said digit portion of said transmit buffer over said receive bus to a selected one of said ports at said respective data rate as call establishment signals;

wherby call establishment can be achieved for X.21 data ports at said respective port data rates.

* * * * *